United States Patent
Rangarajan et al.

(10) Patent No.: US 8,082,222 B2
(45) Date of Patent: Dec. 20, 2011

(54) CMDB FEDERATION METHOD AND MANAGEMENT SYSTEM

(75) Inventors: Govindarajan Rangarajan, Sunnyvale, CA (US); Jiani Chen, San Jose, CA (US)

(73) Assignee: BMC Software, Inc., Houston, TX (US)

( * ) Notice: Subject to any disclaimer, the term of this patent is extended or adjusted under 35 U.S.C. 154(b) by 292 days.

(21) Appl. No.: 12/550,078

(22) Filed: Aug. 28, 2009

(65) Prior Publication Data

US 2010/0179939 A1    Jul. 15, 2010

Related U.S. Application Data

(60) Provisional application No. 61/144,683, filed on Jan. 14, 2009.

(51) Int. Cl.
*G06F 17/30* (2006.01)
(52) U.S. Cl. .................................................. 707/609
(58) Field of Classification Search .............. 707/10, 707/805, 634, 899, 716
See application file for complete search history.

(56) References Cited

U.S. PATENT DOCUMENTS

| | | | | |
|---|---|---|---|---|
| 7,664,806 B1 * | 2/2010 | Koudas et al. | ............... | 707/899 |
| 7,702,646 B2 * | 4/2010 | Rabines et al. | ............... | 707/805 |
| 7,822,714 B2 * | 10/2010 | Chen et al. | ............... | 707/634 |
| 2007/0282856 A1 * | 12/2007 | Mueller et al. | ............... | 707/10 |
| 2008/0114770 A1 * | 5/2008 | Chen et al. | ............... | 707/10 |
| 2010/0094862 A1 * | 4/2010 | Bent et al. | ............... | 707/716 |

OTHER PUBLICATIONS

Carlisle et al.; "Configuration Management Database (CMDB) Federation Specification: Version 1.0.0;" Jun. 22, 2009; 73 pages.
Johnson et al.; "Reconciliation Taxonomy (RTx): Preliminary Draft Verion 0.81;" May 26, 2009; 21 pages.

* cited by examiner

*Primary Examiner* — James Trujillo
*Assistant Examiner* — Thong Vu

(57) ABSTRACT

This disclosure relates generally to the field of Configuration Management Databases (CMDBs). One embodiment of a user interface embodying the present invention is an extension of the process for creating CMDB classes and is therefore readily available for use by someone with knowledge of CMDB administration. The CMDB administrator is thus relieved from having to understand in detail the technologies and interfaces used by the Management Data Repository (MDR) sources. The result of setting up a relation from a CMDB data structure to an MDR data structure by a CMDB administrator may be represented by one or more new CMDB class(es) for the MDR data. The related MDR may then be accessed by an existing CMDB application using already existing CMDB interfaces. The instances of the new relationships and classes thus appear as if they were native instances stored in the CMDB.

20 Claims, 8 Drawing Sheets

CMDB FEDERATION METHOD AND MANAGEMENT SYSTEM

CROSS-REFERENCE TO RELATED APPLICATIONS

This application claims priority to the provisional application Ser. No. 61/144,683 filed on Jan. 14, 2009 entitled "A CMDB Federation Method and Management System" by Govindarajan Rangarajan and Jiani Chen, which is hereby incorporated by reference in its entirety.

BACKGROUND

This disclosure relates generally to the field of ITIL®-based (Information Technology Infrastructure Library) Configuration Management Databases (CMDBs). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for Enterprise Management Software. In enterprise systems management, data about IT business entities such as servers and applications are generally spread across several repositories, known as Management Data Repositories (MDRs). This data is made available to software applications through various standard and non-standard mechanisms such as Structured Query Language (SQL) and/or other proprietary programming interfaces.

The usefulness of these CMDBs is dependent on the quality, reliability and security of the data stored in them. A CMDB often contains data about managed resources known as Configuration Items (CIs). ITIL version 3 defines a CI as: "Any Component that needs to be managed in order to deliver an IT Service. Information about each CI is recorded in a Configuration Record within the Configuration Management System and is maintained throughout its Lifecycle by Configuration Management. CIs are under the control of Change Management. CIs typically include IT Services, hardware, software, buildings, people, and formal documentation such as Process documentation and [Service Level Agreements]."

The CMDB serves as a point of integration between various IT management processes (See FIG. 1). Data from multiple sources often needs to be managed directly or by reference in commercial CMDBs. Thus, there was a need to create a standard for federating the data from various MDRs and/or CMDBs into a single view that appears seamless and integrated to the end user. This standard, known as the CMDB Federation, or CMDBf, Standard was recently adopted by the Distributed Management Task Force (DMTF) as Document Number: DSP0252.

Some of the goals of CMDBf include: enabling a variety of data consumers to access a federation of management data through a standard access interface; enabling a variety of data providers to participate in a federation of management data through a standard provider interface; and providing an approach for reconciling and combining different information about the same resources.

Applications requiring access to distributed management data may utilize one or both of the following methods:
a) Software programmers can write code for a particular application to access each data source through the data sources' supported interfaces and relate the data from different data sources programmatically based on knowledge of the data structures in both data sources.
b) Application developers can use tools provided by generic data integration products/solutions to relate the data from different sources so that applications may access the data through a common interface with two notable limitations: i) Applications which have primarily used CMDB specific interfaces to access management data cause programmers to write or re-write code to use the new interface provided by the integration layer; and ii) The integration layer developers are required to have technical knowledge about the CMDB that many CMDB administrators lack.

What is needed is a method, system and mechanism allowing for dynamic retrieval of data from other MDRs, modeling them as related items and associating them with the core data (e.g., CIs) in a CMDB. This disclosure presents solutions to these and other related problems.

SUMMARY

One embodiment of a user interface embodying the present invention is an extension of the process for creating CMDB classes and is therefore readily available for use by someone with knowledge of CMDB administration. The CMDB administrator is thus relieved from having to understand in detail the technologies and interfaces used by the MDR sources. The result of setting up a relation from a CMDB data structure to an MDR data structure by a CMDB administrator may be represented by one or more new CMDB class(es) for the MDR data. The related MDR may then be accessed by an existing CMDB application using already existing CMDB interfaces. The instances of the new relationships and classes thus appear as if they were native instances stored in the CMDB.

In an illustrative embodiment of the federation capabilities described more fully herein, the basic aspects include the following:
1.) Ability to register various repositories (e.g., MDRs) with the CMDB. This may include the following steps: a) Specifying the mechanism to retrieve such remote data (e.g., web services, JDBC, etc.). b) Defining the class(es) to model federated information. For example, a user may define a class called INCIDENT to model incident information. c) Define associations with CIs in the CMDB. For example, the user may associate the federated class INCIDENT to the class COMPUTER SYSTEM in the CMDB.
2.) An Application Programming Interface (API) and data model that can be used to seamlessly query data from both the core CMDB and other remote repositories.
3.) A mechanism to display both core and related data in a User Interface (UI) in a consistent fashion.

In one embodiment, a computer system comprising a programmable control device is programmed to perform a data federation method for a CMDB, the method comprising: receiving information from a CMDB client, the information comprising: a selection of a federated data class, interface connection information for one or more Management Data Repositories (MDRs) that contain information associated with the federated data class, wherein the interface connection information comprises information that is used by the CMDB to connect to the one or more MDRs, and a selection of one or more join conditions, wherein the one or more selected join conditions are used to relate the federated data class to one or more classes residing in the CMDB; sending a query to the one or more MDRs based on at least a portion of the received information; receiving a query result set; and providing at least a portion of the query result set to the CMDB client.

In yet another embodiment, the computer system is further programmed to create a federated data class and store attributes related to the created federated data class in a memory medium.

In yet another embodiment, the computer system is further programmed to receive one or more attributes from the one or more MDRs, wherein the one or more selected join conditions involve one or more of the received attributes.

In yet another embodiment, the instructions for carrying out the above described methods are tangibly embodied on a computer useable memory medium.

In yet another embodiment, a computer network is utilized to carry out the above described methods.

DETAILED DESCRIPTION

Methods and systems to provide a mechanism for dynamically retrieving data from MDRs, modeling them as related items, and associating them with core data in a CMDB are described herein. The user interface is an extension of the process for creating CMDB classes, and may be used by someone with knowledge of CMDB administration, with only cursory knowledge of the technologies and interfaces used by the MDR sources. One result of setting up a relation from a CMDB data structure to an MDR data structure by the administrator is a new CMDB class representing the MDR data. The related MDR data can then be accessed by an existing CMDB application using whatever CMDB interfaces it already uses, simply by querying for instances of the new relationships and classes as if they were native instances stored in the CMDB.

Figure 1:
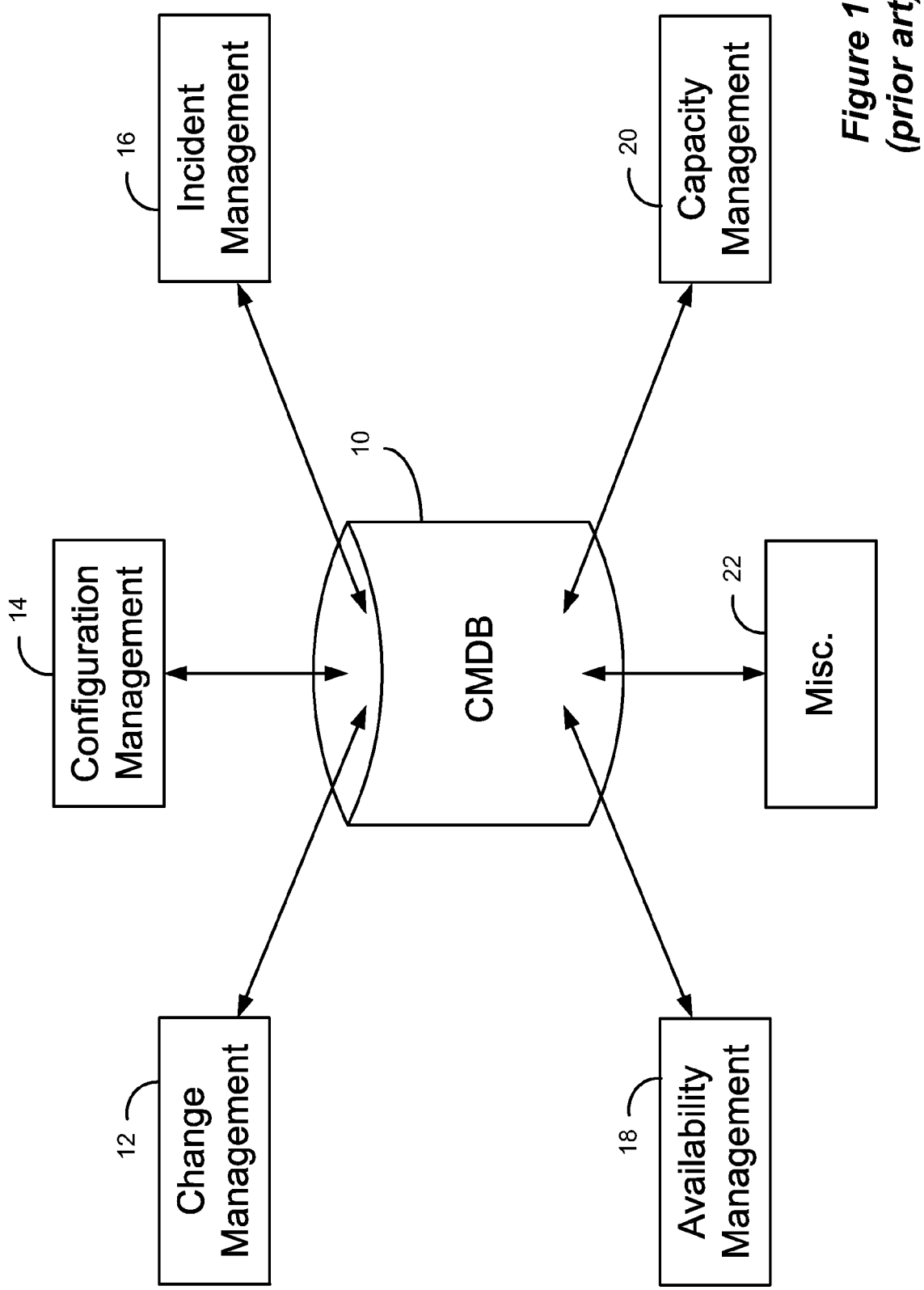
FIG. 1 shows a CMDB serving as a point of integration between various IT management processes.

As mentioned above, the usefulness of CMDBs is dependent on the quality, reliability and security of the data stored in them. A CMDB often contains data about managed resources like computer systems and application software, process artifacts like incident and change records, and relationships among them. In FIG. 1, the CMDB 10 serves as a point of integration between various IT management processes (Elements 12-22). Data from multiple sources often needs to be managed directly or by reference in commercial CMDBs. These IT management process may include, for example, Change Management 12, Configuration Management 14, Incident Management 16, Availability Management 18, Capacity Management 20, and any other number of Miscellaneous IT Processes 22 that an enterprise may find it useful to monitor.

Figure 2:
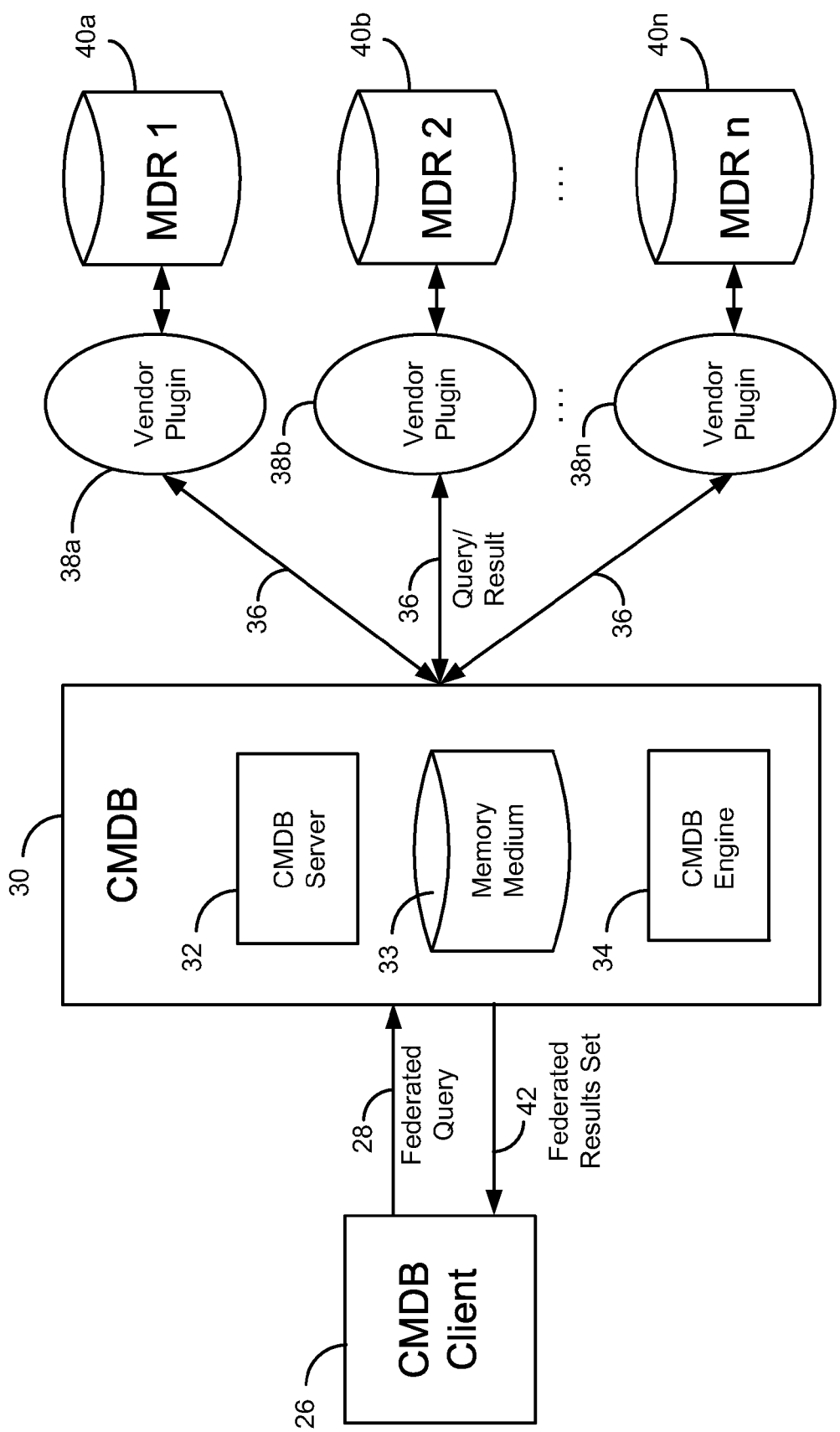
FIG. 2 shows, in block diagram form, the architecture of a CMDB capable of dynamically retrieving data from other MDRs and associating them with the core CIs in the CMDB.

FIG. 2 shows the architecture of a CMDB capable of dynamically retrieving data from other MDRs and associating them with core CIs in the CMDB. Core data for the enterprise IT configuration management may be stored in the Central CMDB 30. CMDB 30 may comprise a CMDB server 32, a CMDB Engine 34 for processing queries and retrieving data, a data storage memory medium 33, as well as other related applications, such as a reconciliation engine (not shown) and a normalization engine (not shown). Related data, for example, data that is stored outside the central CMDB 30, could reside in MDRs 40a-40n and be federated by the CMDB 30. The data model that is employed by the CMDB (referred to herein as the "CMDB-DM") could be used as the data model for both local and federated data. In instances where the remote data in the MDRs is modeled differently than it is in existing CMDB-DM classes, it may be transformed to the CMDB-DM by defining new CMDB-DM classes and suitably mapping the remote data model to the CMDB-DM classes. The CMDB API would thus be able to work seamlessly across both local and federated data.

One example of a workflow that would engage the architecture of FIG. 2 is described as follows. A user has some data residing in an MDR such as an ORACLE® database, say, Element 40a, that is related to data in CMDB 30. (ORACLE is a registered trademark of Oracle International Corporation.) The user wants to federate to the data residing in database 40a and be able interface with that data as if it were data in existing classes residing in CMDB 30. For example, the user would like to be able to retrieve data in the remote database 40a and be able to query the remote database 40a as if it were part of the CMDB 30.

To achieve such a result in accordance with one embodiment of the present invention, the user could launch a CMDB Client application 26 which would present him with a "Federation User Interface." This application 26 could allow the user to select and/or create a new federated data class that he wants to work with. At this point, if the user selects to create a new federated data class, he would then need to specify more information about the federated interface, i.e., where the external source data will be coming from and how the application will connect to the external source. For example, the data may be federated to via any type of data federation interface, such as the Java Database Connectivity (JDBC) API, the Open Database Connectivity (ODBC) API, the CMDBf Standard, or any other suitable means.

Depending on the type of data federation, more interface connection information will be gathered from the user that is related to the type of federation interface selected. For example, a user may need to specify: username, password, connection string, connection URL, etc. A federated data class may then be created by the CMDB Client application 26. The user may be asked to specify a new federated data class name, as well as the attributes they want to have in this class by selecting fields from the MDR 40a that he is attempting to federate to. A so-called "key" attribute may also have to be specified. The key may be used to uniquely identify a record or as part of a join condition to link between the remote class in the MDR 40a and the existing CMDB-DM classes residing in CMDB 30 that it is being related to.

A user can then create a federated data relationship class. In one embodiment, the relationship class will define the "end point classes" of the defined relation. For example, a first object class could be a CMDB-DM class, such as "Computer System," and a second object class could be the newly created Federated data class representing a CI, such as "Incident." The user will also be able to specify a join condition, i.e., a qualification, which defines how the data in the CMDB-DM class will be related to data in the federated data class. This join condition can be as complicated or as simple as is needed for the user to be able to gain access to the desired information.

Figure 3:
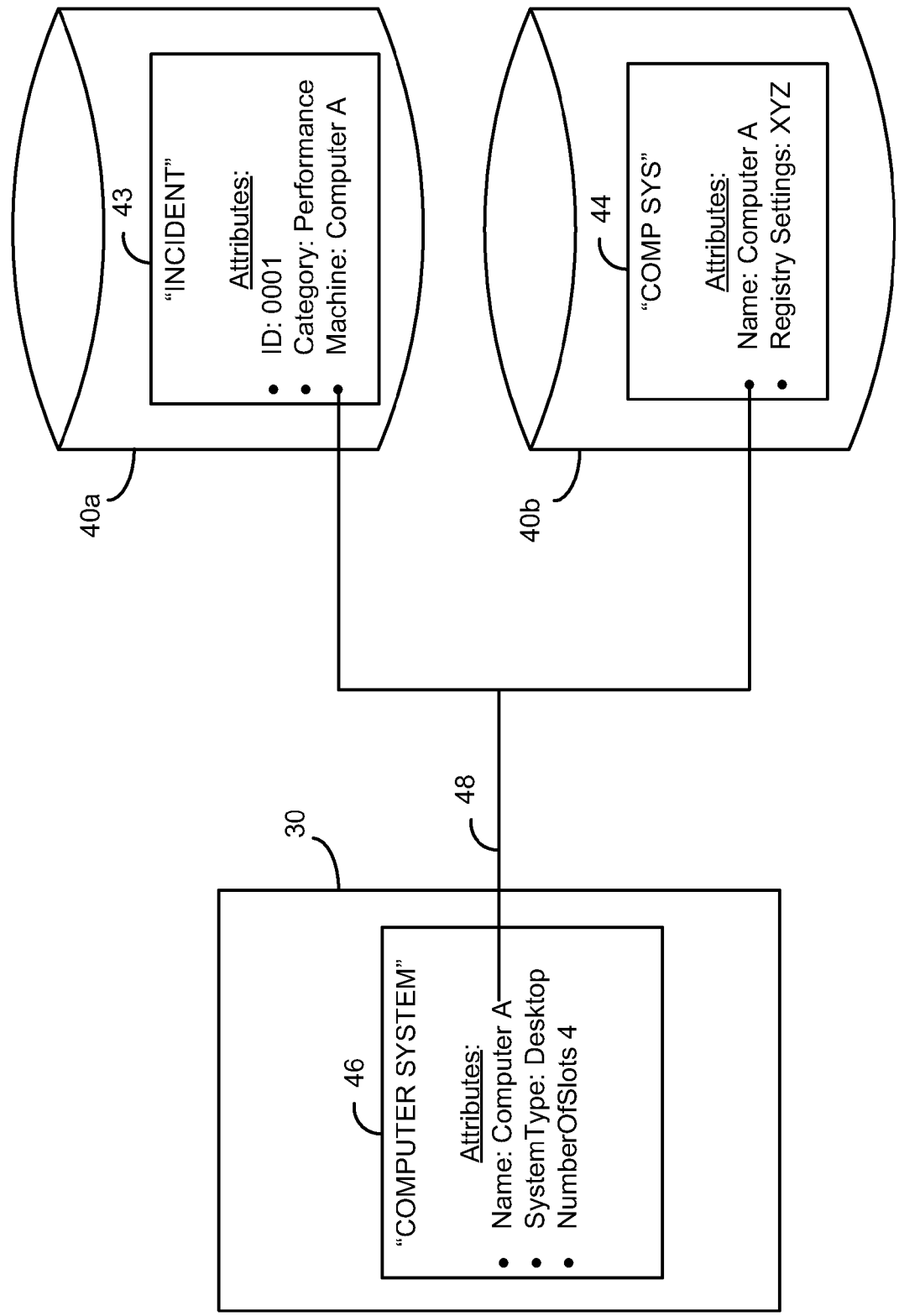
FIG. 3 shows, in block diagram form, an example of linking a CMDB instance to data outside the central CMDB.

FIG. 3 shows one example of the creation of such a federated data class. In this example, the CMDB-DM class "Computer System" 46 already exists in the CMDB 30. It may include attributes such as: Name, SystemType, and NumberOfSlots. Federated data class "Incident" 43 may be created from CI data residing in external MDR 40a. In this example, the user has selected that the join condition 48 will include instances where the Computer System class's "Name" attribute matches the Incident class's "Machine" attribute. Likewise, Federated data class "Comp Sys" 44 may be created from CI data residing in external MDR 40b. In this example, the user has selected that his join condition 48 will include instances where the Computer System class's "Name" attribute matches the federated Comp Sys class's "Name" attribute. As can be seen in FIG. 3, the creation of the federated data classes allows the CMDB seamless access to more data attributes associated with the "Computer A" CI than the CMDB would otherwise have access to via a standard CMDB interface.

At this point, the desired federated data and relationship classes have been defined. Referring back now to FIG. 2, the user can use CMDB Client 26 to design queries and view desired data. CMDB Client 26 may issue API calls to seamlessly query 28 the federated data classes as though they are native CMDB-DM classes. The CMDB Engine 34 may then issue the necessary query calls 36, e.g., Query By Path (QBP) calls, which connect to external MDRs 40 via any one of various vendor plug-in interfaces 38. The QBP can then step through the federated relationship and federated data classes, i.e., follow the defined path, access the data that the user desires to see, and return it to the CMDB 30. The federated query result set 42 can then be provided to the CMDB Client Application 26's UI to display both core and related data in a consistent fashion and to allow the user to take appropriate action. The UI should be flexible enough to allow for the visualization of the federated instances and the configuration of various options for viewing the federated data. The bi-directional arrows in FIG. 2 indicate that data may be sent in both directions over the link that is logically represented by the bi-directional arrow. The location of various elements inside other elements is meant to imply a logical association only, and is in no way intended to be construed as a limiting embodiment.

Figure 4:
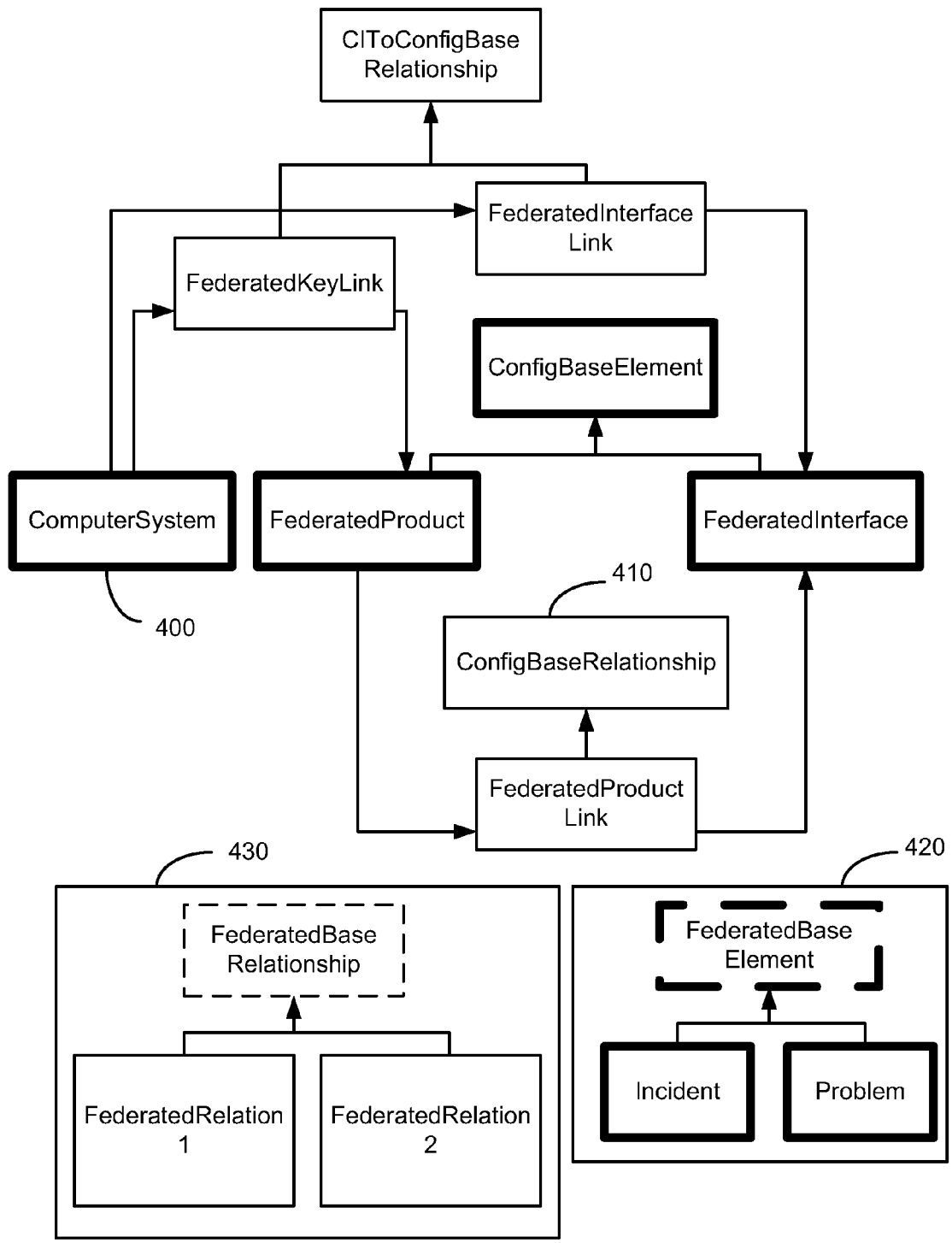
FIG. 4 shows, in class diagram form, the federation related classes, relationships and their interaction.

FIG. 4 shows an exemplary class diagram for carrying out one embodiment of the disclosed invention, including the federation related classes, relationships and their interactions. The boxes with thick rims are the CI classes 400, representing various services, hardware, software, buildings, people, etc. in the enterprise environment. The boxes with thin rims represent relationship classes 410 defining the connections between the various CI classes. The box labeled 420 represents the FederatedBaseElement and its potential subclasses. Subclasses will be created when a user defines new federated data classes for federating data. The box labeled 430 represents the FederatedBaseRelationship and several sample derived classes. In this embodiment, the derived relationship classes will only be class definitions which hold the query qualifier. Boxes with dashed lines represent abstract classes.

Figure 5A:
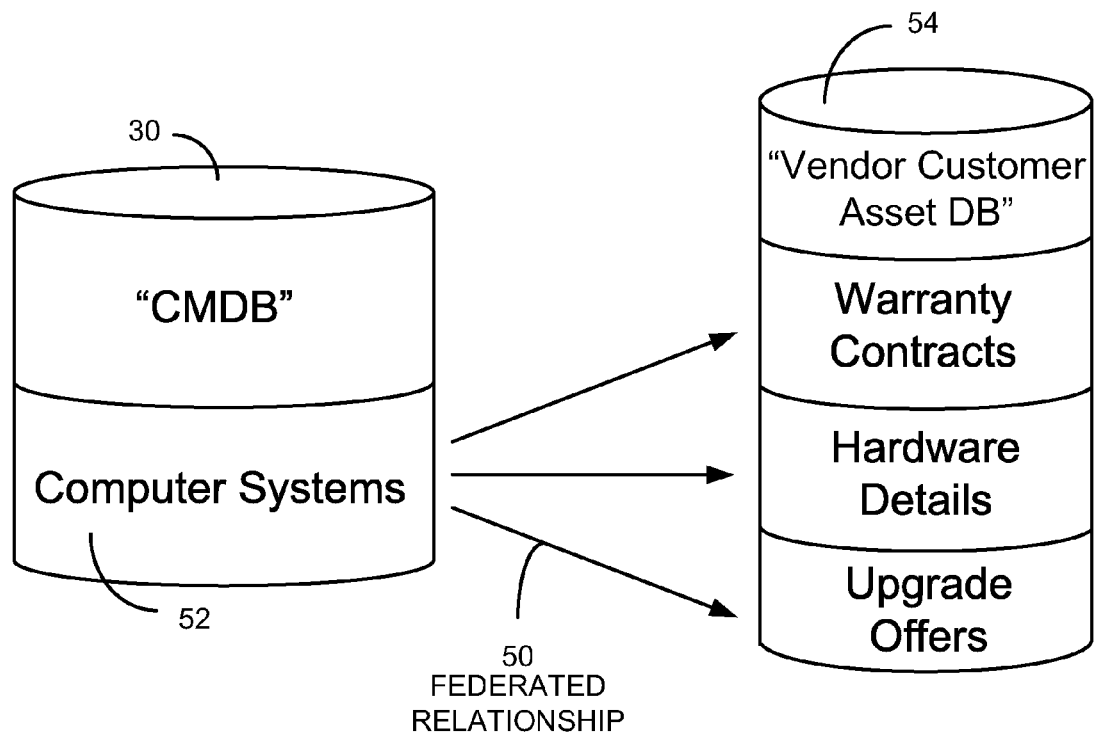
FIG. 5A shows a use case for Query By Path (QBP) federating remote MDRs with CMDB CIs.
Figure 5B:
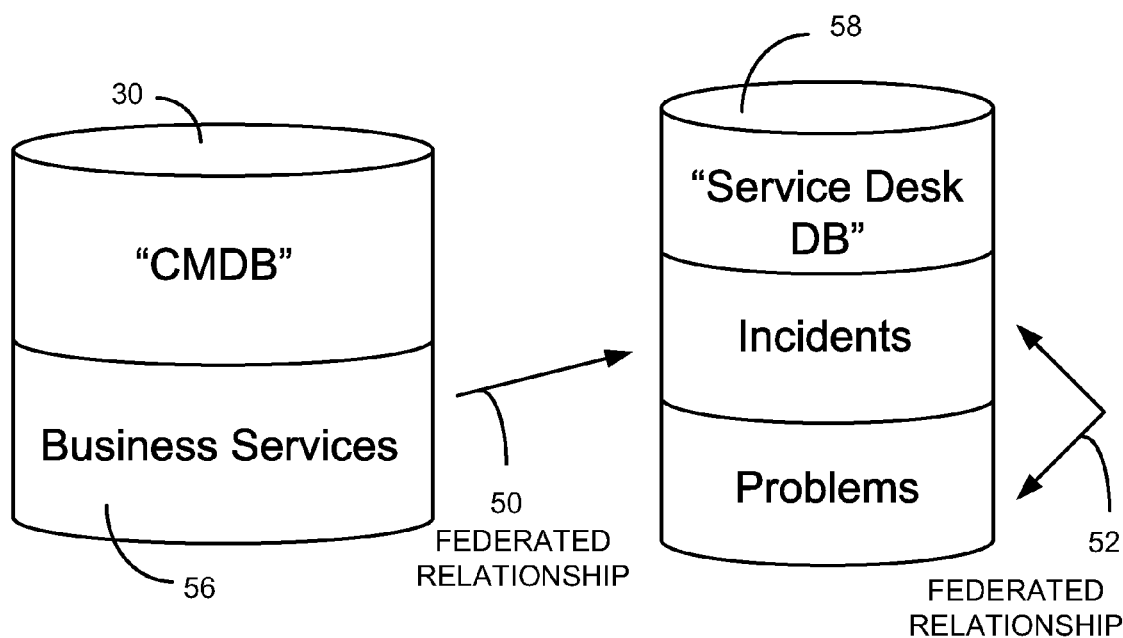
FIG. 5B shows a use case for QBP federating remote MDRs with CMDB CIs.

FIGS. 5A and 5B show exemplary use cases for QBPs federating remote MDRs with CMDB CIs. In order for QBP to work properly with federated data classes, one embodiment of the present invention allows for dynamic joins to work against vendor MDRs. Before executing a QBP, the user may need to specify a federated data relationship class as the relationship connecting the CMDB-DM classes and federated data classes. For example, BaseElement->FederatedDataRelationship1->FederatedMDR1. During the query, when the CMDB engine 34 processes a federated data relationship class, it may construct the join condition 48 between the CMDB-DM class and the Federated data class based on the specified join characteristic for the federated relationship class. The federated query result set 42 can return the results of dynamically linking to the MDRs based on the specified join characteristic to the CMDB client application 26.

In the example of FIG. 5A, CMDB 30 possesses a core CMDB-DM class identified as Computer Systems 52. Here, the class Computer Systems 52 has a federated relationship 50 to various CI classes in Vendor Customer Asset DB 54. For example, Vendor Customer Asset DB 54 may possess classes such as Warranty Contracts, Hardware Details, and Upgrade Offers. Once the user has specified the federated relationship 50 between the Computer System class 52 and the various Federated Data classes in Vendor Customer Asset DB 54, the user would be able to query CMDB 30 with various complex queries that pull data from multiple disparate and remote data sources. For example, a user of the system illustrated in 5A could query for Computer Systems with warranties expiring in less than two months (via a join to the Warranty Contracts federated class) that have recalled CPU units (via a join to the Hardware Details federated class) on which the manufacturer is offering a free upgrade (via the Upgrade Offers federated class). In this way, the user is able to seamlessly query and retrieve a result set from multiple databases that may be provided by multiple vendors, have different interfaces and/or data models, and be located in physically different locales.

FIG. 5B shows an exemplary use case for QBP federating remote MDRs with CMDB CIs, wherein the remote MDR classes themselves are related in some manner. In this example, CMDB 30 possesses a core CMDB-DM class identified as Business Services 56. Here, the Business Services 56 has a federated relationship 50 to one of the CI classes in the Service Desk DB 58, in this example, Incidents. Service Desk DB 58 may also possess other classes, such as Problems. Once the user has specified the federated relationship 50 between the Business Services class 56 and the Incident class in Service Desk DB 58, as well as the federated relationships 52 between the federated classes in Service Desk DB 58 themselves, i.e., Incidents and Problems in this example, the user would be able to query CMDB 30 with various complex queries that pull data from multiple disparate and remote data sources or MDRs. For example, a user of the system illustrated in 5B could query for Business Services affected by Incidents (via a join to the Incidents federated class) that are of a Mechanical Failure (via the federated relationship between the Incidents federated class and the Problems federated class). In this example, the Business Service is only directly tied to the Incident, not to information regarding the specific type of Incident (here, a "Problem") associated with the Business Service.

Figure 6:
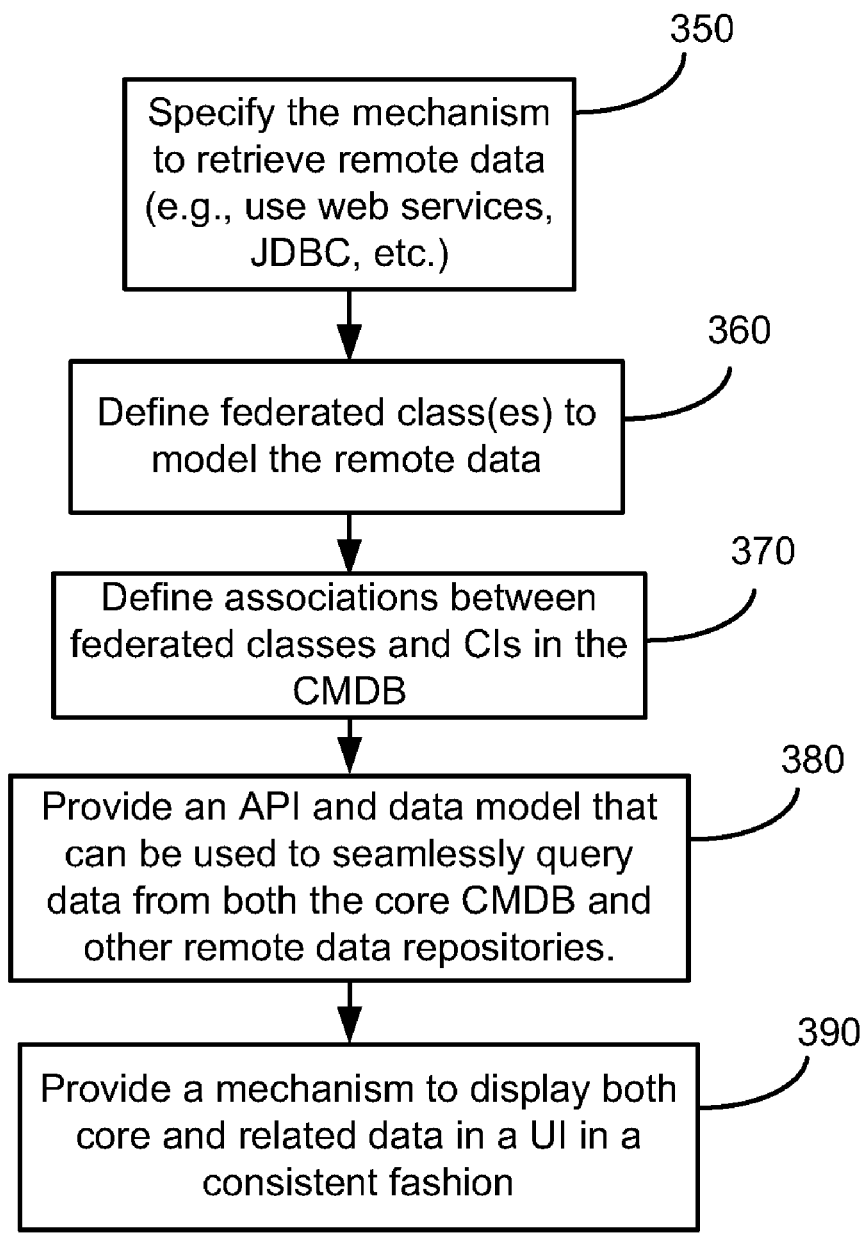
FIG. 6 shows, in flowchart form, an example of a federated query in accordance with one embodiment of the invention.

FIG. 6 shows, in flowchart form, an example of a federated query in accordance with one embodiment of the invention. First, the user specifies the mechanism to retrieve remote data (e.g., use web services, JDBC, etc.) (Step 350). Next, the user defines the necessary federated class(es) to model the remote data (Step 360). Next, the user may define associations between the federated classes and the CIs in the CMDB (Step 370). The CIs in the CMDB may be pre-existing or newly created. Once the desired associations have been established, the user may seamlessly query data from both the core CMDB and other remote data repositories via the CMDB's API and data model (Step 380). Finally, the user is provided with a mechanism to display both core and related data in a UI in a consistent fashion. It is to be understood that the order of the steps as illustrated in FIG. 6 is merely exemplary and that, in some instances, these steps may be performed in a different order, in addition to other steps, concurrently, or not at all.

Figure 7:
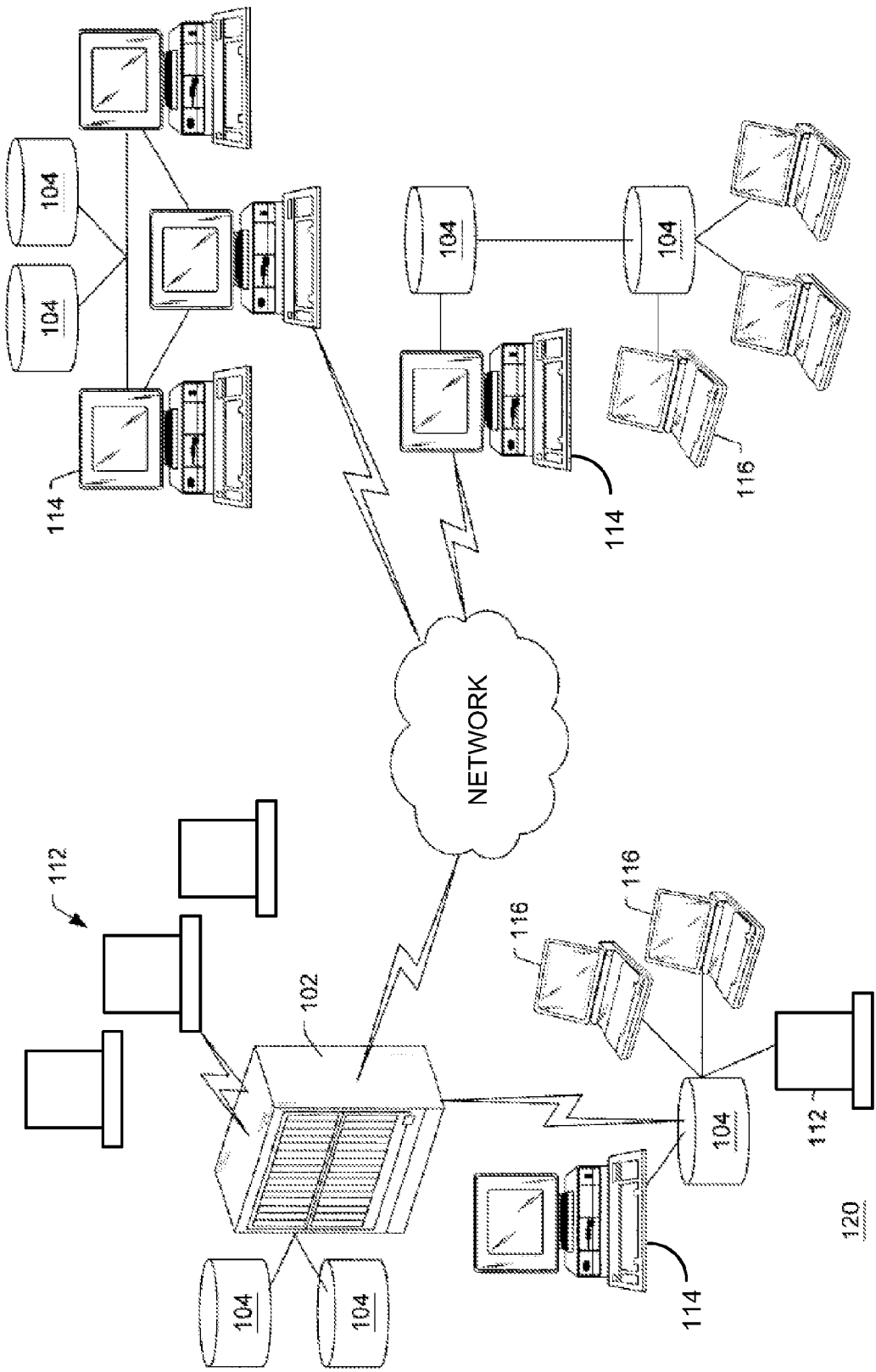
FIG. 7 shows an exemplary enterprise computing environment.

FIG. 7 illustrates an exemplary enterprise computing environment wherein one embodiment of the present invention may be installed. The CMDB 30 may be installed and running on any one or more of the computing endpoints in communication with the network shown in FIG. 7. As shown, the enterprise computing environment may include one or more computers, e.g., mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or part of the mainframe computer 102.

The mainframe computer system 102 may be coupled to one or more other computer systems and/or computer networks, including other mainframe computer systems. The mainframe computer system 102 may be coupled locally to a computer system network 120 in a local area network (LAN) configuration, or may be coupled to one or more computer systems and/or networks through a wide area network (WAN). As shown in FIG. 7, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 7, the mainframe computer 102 may also be coupled through a wide area network, represented by the "cloud" that is labeled "Network" in FIG. 7, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art, as well as a display device. In a similar manner, each of the desktop computer systems 114 and/or portable computer systems 116, or other computer systems comprised in the enterprise, comprise various standard computer components including one or more CPUs, one or more buses, memory, a power supply, non-volatile memory, and a display, such as a video monitor or LCD display. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. The database stored in the mainframe computer system 102 may be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, e.g., one or more of the file servers 104 may store its own database which is desired to be replicated among various of the other file servers and/or the mainframe computer system 102.

One or more of the computer systems 102, 112, 114, and 116 preferably include a memory medium on which computer programs according to the invention may be stored. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described herein.

Various embodiments further include receiving or storing instructions and/or data implemented in accordance with the foregoing description upon a carrier medium. Suitable carrier media include a memory medium as described below, as well as signals such as electrical, electromagnetic, or digital signals, conveyed via a communication medium such as networks 102 and/or 104 and/or a wireless link.

Figure 8:
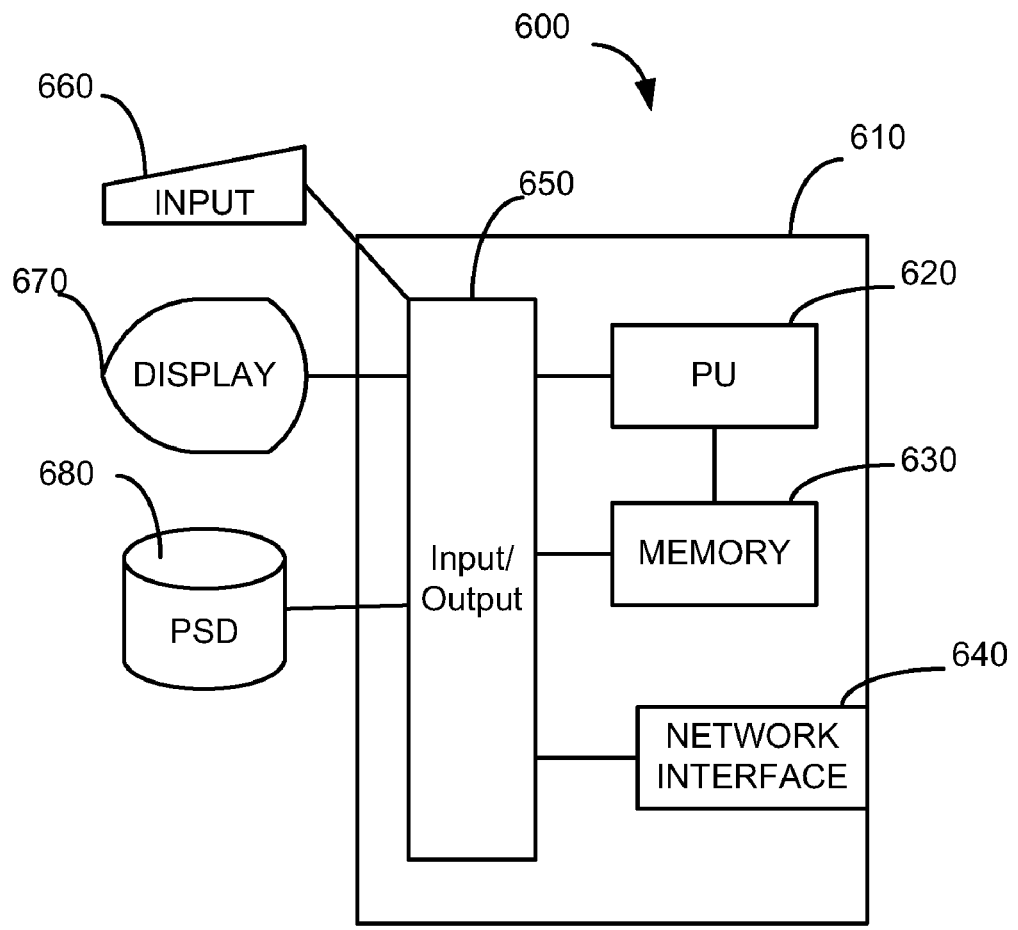
FIG. 8 shows, in block diagram form, an exemplary computer system comprised of a program control device.

Referring now to FIG. 8, an exemplary computer system 600 is shown. One or more exemplary computer systems 600 may be included in a mainframe computer (e.g., Element 102 in FIG. 7). Exemplary computer system 600 may comprise a programmable control device 610 which may be optionally connected to input 660 (e.g., a keyboard, mouse, touch screen, etc.), display 670 or program storage device (PSD) 680 (sometimes referred to as direct access storage device DASD). Also, included with program device 610 is a network interface 640 for communication via a network with other computing and corporate infrastructure devices (See FIG. 7). Note that network interface 640 may be included within programmable control device 610 or be external to programmable control device 610. In either case, programmable control device 610 will be communicatively coupled to network interface 640. Also note that program storage unit 680 represents any form of non-volatile storage including, but not limited to, all forms of optical and magnetic storage elements including solid-state storage.

Program control device 610 may be included in a computer system and be programmed to perform methods in accordance with this disclosure. Program control device 610 comprises a processor unit (PU) 620, input-output (I/O) interface 650 and memory 630. Processing unit 620 may include any programmable controller device including, for example, processors of an IBM mainframe (such as a quad-core z10 mainframe microprocessor). Alternatively, in non mainframe systems, examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 6 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 6 may be performed by an exemplary computer system 600 comprising a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium" or "computer useable medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. However, those of ordinary skill in the art will recognize that information may also be maintained as structured text, binary object data (e.g., binary data structures), HTML, XML or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer processor programmed to perform a data federation method for a Configuration Management Database (CMDB), the method comprising:
   receiving information from a CMDB client, the information comprising:
      a selection of a federated data class,
      interface connection information for one or more Management Data Repositories (MDRs) that contain information associated with the federated data class, wherein the interface connection information comprises information that is used by the CMDB to connect to the one or more MDRs, and
      a selection of one or more join conditions, wherein the one or more selected join conditions are used to relate the federated data class to one or more classes residing in the CMDB;
   defining a new federated data class using the one or more join conditions;
   sending a query to the one or more MDRs based on the new federated data class;
   receiving a query result set; and
   providing at least a portion of the query result set to the CMDB client.

2. The processor of claim 1, wherein the processor is further programmed to:
   store attributes related to the new federated data class in a memory medium.

3. The processor of claim 2, wherein the stored attributes comprise at least one of the following: a federated data class name and one or more attributes corresponding to one or more attributes from an MDR.

4. The processor of claim 1, wherein the processor is further programmed to:
   receive one or more attributes from the one or more MDRs, wherein the one or more selected join conditions involve one or more of the received attributes.

5. The processor of claim 1, wherein the program to perform the act of querying one or more MDRs uses Query By Path (QBP).

6. The processor of claim 1, wherein the program to perform the act of querying one or more MDRs comprises using a plug-in to interface with the one or more MDRs.

7. The processor of claim 1, wherein the program to perform the act of querying is specified by an administrator, an end user, or another computer system.

8. The processor of claim 1, wherein one or more of the method steps the processor is programmed to perform occur via an administrator or an end user using a user interface.

9. A non-transitory computer usable medium having computer readable program code embodied therein, wherein the computer readable program code is adapted to be executed to:
   receive information from a configuration management database (CMDB) client, the information comprising:
      a selection of a federated data class,
      interface connection information for one or more Management Data Repositories (MDRs) that contain information associated with the federated data class, wherein the interface connection information comprises information that is used by a CMDB to connect to the one or more MDRs, and a selection of one or more join conditions, wherein the one or more selected join conditions are used to relate the federated data class to one or more classes residing in the CMDB;

define a new federated data class using the one or more join conditions;

send a query to the one or more MDRs based on the new federated data class;

receive a query result set; and provide at least a portion of the query result set to the CMDB client.

10. The non-transitory computer usable medium of claim 9, wherein the computer readable program code is further adapted to be executed to:

store attributes related to the new federated data class in a memory medium.

11. The non-transitory computer usable medium of claim 10, wherein the stored attributes comprise at least one of the following:

a federated data class name and one or more attributes corresponding to one or more attributes from an MDR.

12. The non-transitory computer usable medium of claim 9, wherein the computer readable program code is further adapted to be executed to:

receive one or more attributes from the one or more MDRs, wherein the one or more selected join conditions involve one or more of the received attributes.

13. The non-transitory computer usable medium of claim 9, wherein the program code to perform the act of querying one or more MDRs comprises a Query By Path (QBP).

14. The non-transitory computer usable medium of claim 9, wherein the program code to perform the act of querying one or more MDRs comprises using a plug-in to interface with the one or more MDRs.

15. A computer network executing a data federation method for a configuration management database (CMDB), the computer network comprising:

one or more non-volatile storage devices for maintaining enterprise configuration management information;

one or more computer systems communicatively coupled to the network, at least one of the one or more computer systems programmed to perform at least a portion of the method the computer processor of claim 1 is programmed to perform, wherein the entire method the computer processor of claim 1 is programmed to perform is performed collectively by the one or more computer systems communicatively coupled to the network.

16. The computer network of claim 15, further comprising:

a plurality of management data repositories (MDRs); and a plurality of plug-in interfaces, wherein each of the plurality of MDRs is associated with one or more plug-in interfaces, and wherein the plurality of plug-in interfaces are configured to interface with the CMDB.

17. The computer network of claim 15, wherein the plurality of MDRs exist on a single computer.

18. The computer network of claim 15, wherein the plurality of MDRs do not all exist on a single computer.

19. The computer network of claim 15, further comprising a client application, wherein the client application is configured to query the CMDB.

20. The computer network of claim 19, wherein the client application comprises a user interface.

* * * * *